United States Patent [19]

Mori et al.

[11] Patent Number: 4,789,880
[45] Date of Patent: Dec. 6, 1988

[54] FOCUSING DEVICE FOR USE IN OPTICAL APPARATUSES

[75] Inventors: Shinichi Mori; Keijiro Sakamoto; Hiroaki Nakauchi; Akiyoshi Hamada, all of Toyokawa; Kazuyuki Yoshida, Toyohashi, all of Japan

[73] Assignee: Minolta Camera Kabushiki Kaisha, Osaka, Japan

[21] Appl. No.: 74,052

[22] Filed: Jul. 16, 1987

[30] Foreign Application Priority Data

Jul. 16, 1986 [JP] Japan ................................. 61-167380
Sep. 1, 1986 [JP] Japan ................................. 61-205575

[51] Int. Cl.$^4$ ........................................... G03B 27/52
[52] U.S. Cl. ........................................ 355/55; 355/56
[58] Field of Search .................... 355/55, 56; 354/403, 354/404; 250/201

[56] References Cited

U.S. PATENT DOCUMENTS 4,696,559 9/1987 Kondo ................................. 354/403

FOREIGN PATENT DOCUMENTS 60-227241 12/1985 Japan .
60-247157 4/1986 Japan .

Primary Examiner—L. T. Hix
Assistant Examiner—D. Rutledge
Attorney, Agent, or Firm—Burns, Doane, Swecker & Mathis

[57] ABSTRACT

A focusing device for use in micro film readers or the like for projecting micro images to give in-focus conditon exactly and readily. The present device includes a memory for storing a distance data representing the distance between an original and a projective lens at in-focus position thereof, and a sensor for measuring the distance between an original and the projective lens wherein the projective lens is moved to the in-focus position by a focusing motor in response to the distance data stored in the memory and a signal representing the measured distance generated from the sensor.

21 Claims, 8 Drawing Sheets

FOCUSING DEVICE FOR USE IN OPTICAL APPARATUSES

BACKGROUND OF THE INVENTION

The present invention relates to a focusing device for use in optical apparatuses such as microfilm readers or microfilm reader-printers for enlarging and projecting images of various types of microfilms such as roll type or fiche type to read or print the projected image.

In optical system in the microfilm readers or the microfilm reader-printers for enlarging and projecting images of a microfilm, high magnifications are required. Accordingly, the microfilm readers are so constructed that a distance between a microfilm and a projective lens is very short as compared with the distance between the projective lens and an image surface. Under such construction, a little fluctuation in the distance between the microfilm and the projective lens results in a seriously blurred image because of the shift of focus.

Nevertheless, conventional microfilm readers or microfilm reader-printers employ a manual focusing operation method which is difficult and consumes much time to achieve the in-focus condition. Even once the in-focus condition has been achieved, the condition is likely to be lost or shifted by vibration or by operator's slight touching or hitching on the device, and so forth. Such a shift will raise particularly serious problems when printing is made by projecting an image of a microfilm on a photoreceptor. Consequently, it is necessary to manually make focusing operation and to correct the operation again and again when being out of focus. Thus, the operators sustain inconvenience.

On the other hand, Japanese Patent Laid-open Nos. 60-227241 and 61-247157 (laid open on Nov. 12, 1985 and on Nov. 4, 1986 respectively) disclose known devices provided with automatic focusing function which enables automatic attainment of the in-focus condition for microfilm readers.

Such Japanese conventional devices include a sensor for receiving light located at the side of an image surface for automatic focusing achieved by means of the fact that the sensor receives light coming through a projective lens to detect condition of an image formed.

This method is convenient, because the focusing is automatically performed. However, the known sensor in the conventional devices is positioned out of the screen on which the image to be read is projected through an ordinal optical path. With this arrangement, it is necessary for the film to be provided with a special mark or image so as to project the image thereof onto the sensor for detecting the focus condition. Another known sensor in the conventional devices is positioned in the other optical path which is divided or changed from the ordinal optical path by deflection of a mirror. With this arrangement, the body of the microfilm reader will be increased in size because the part of the projection light temporarily deviating from the ordinal optical path must be accommodated in the body which is mostly occupied by the optical path. A mechanism for temporarily deflecting the projection light is further necessary, resulting in complex structure and high cost.

SUMMARY OF THE INVENTION

The main object of the present invention is to provide a focusing device which is readily adapted for conventional microfilm reader-printer or the like, being simple in structure without requiring increase in the size of the apparatus, and which permits automatic adjustment of the in-focus condition achieved once and for all against any shifting that might occur later.

Another object of the present invention is to provide a focusing device being simple in structure without requiring increase in the size of the apparatus employing the present device, wherein a projective lens is moved to its in-focus position by making use of a distance data representing a distance between an original and the projective lens at its in-focus position and a distance data representing a measured distance between an original and the projective lens before focusing.

Another object of the present invention is to provide a focusing device which permits automatic adjustment immediately upon and in response to a shift of the projective lens from in-focus position by storing in a memory means the distance data between an original and the projective lens at in-focus position and combining the memory means with a measurement means.

Another object of the present invention is to provide a focusing device wherein automatic focusing is exactly achieved after an initial focusing cycle with the simplest structure by using (storing) a position signal at in-focus obtained by manual focusing (in the memory means) as the distance data to be stored.

Still another object of the present invention is to provide a focusing device wherein distance data inherent to the projective lenses are preliminarily stored, whereby enabling automatic focusing to be done from the initial cycle and facilitating exchange between focusing lenses of various magnifications.

BRIEF DESCRIPTION OF THE DRAWINGS (Throughout all drawings, like parts are designated by like reference numerals.)

DETAILED DESCRIPTION OF THE INVENTION

An embodiment of the present nvention in which the initial focusing is manually performed is described hereunder with reference to FIGS. 1 through 7.

Figure 3:
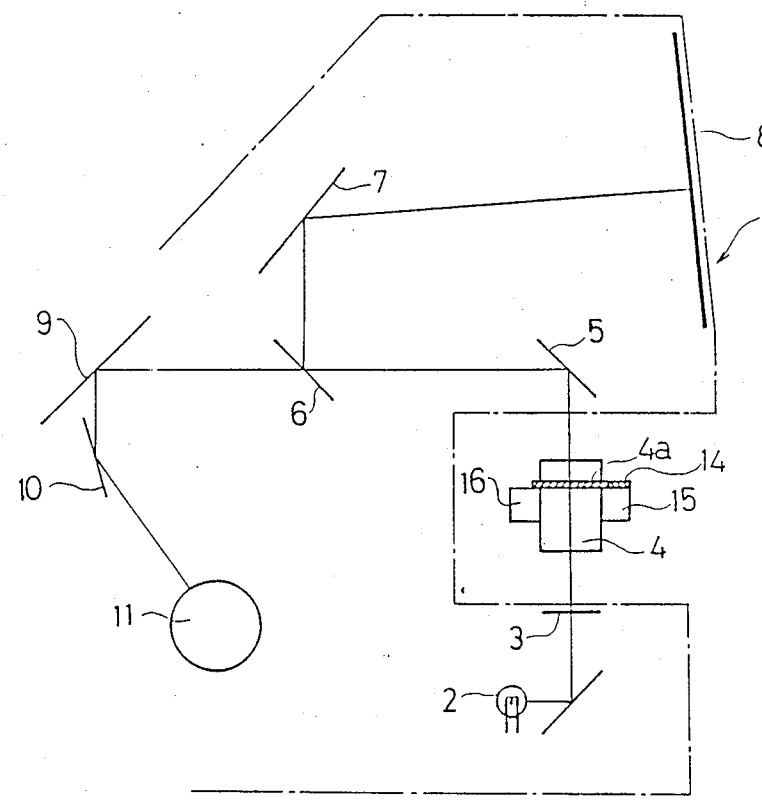
FIG. 3 is a schematic side view of a microfilm reader-printer incorporated the device of FIG. 1.

First, the whole composition of a microfilm reader-printer shown in FIG. 3 will be described. The light from a light source 2 is projected onto a microfilm 3 and an image is projected onto a screen 8 through a projective lens 4, a first mirror 5, a second mirror 6 in reader system and third mirror 7 in reader system. Or with the second mirror 6 in reader system dislocated to be out of the optical path, the image may be projected to a photoreceptor 11 through a second mirror 9 in printer system and a third mirror 10 in printer system, thereby enabling the image of the microfilm 3 to be printed.

Figure 1:
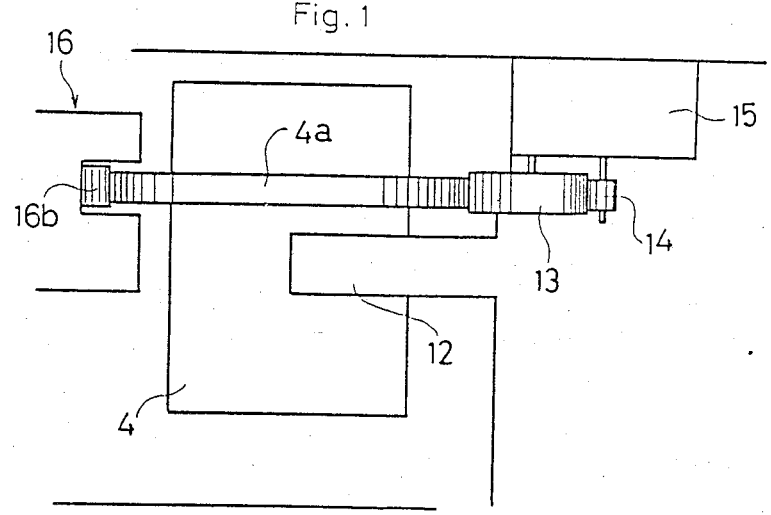
FIG. 1 is a schematic and partial side elevation showing an embodiment of the present invention, i.e. a focusing device in which a distance signal in focus is obtained by an initial manual focusing.
Figure 4:
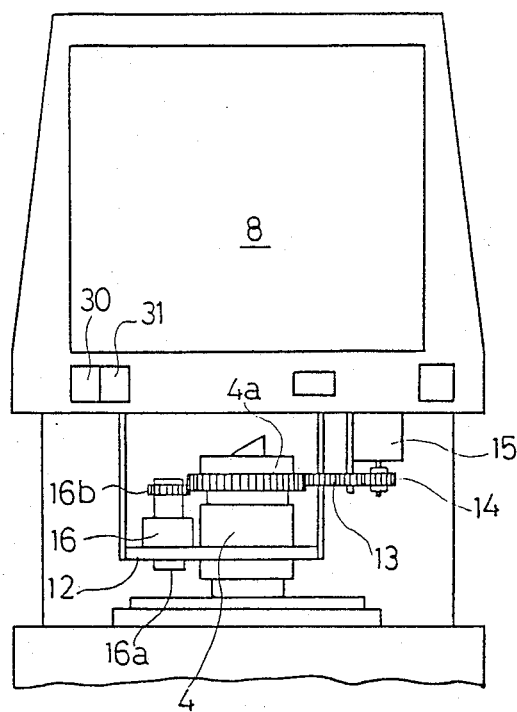
FIG. 4 is a front elevation of the device shown in FIG. 3.

The projective lens 4 is supported by a lens holder 12 so as to be movable along the optical axis by turning a focus gear 4a as shown in FIGS. 1 and 4.

The focus gear 4a is engaged with a drive pinion 14 attached to a drive motor 15 through an intermediate gear 13. And the focus gear 4a is also engaged with a movable gear 16b of a measurement device 16, so that a measuring section 16a of the measurement device 16 will move relatively the movement of the lens 4.

Figure 2:
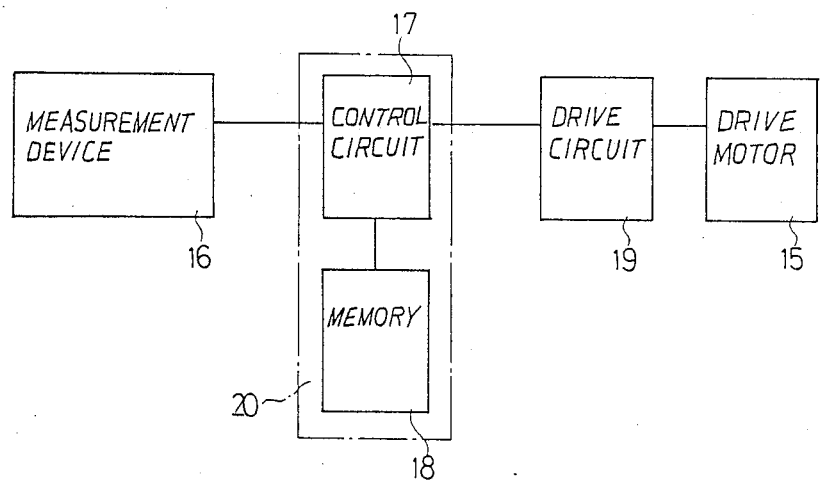
FIG. 2 is a block diagram of a control circuit of the device shown in FIG. 1.

The measurement device 16 detects a distance to a microfilm 3 therefrom and generates a signal to input the signal into a control circuit 17 connected to a memory 18 as shown in FIG. 2. A signal outputted from the control circuit 17 is inputted into a driving circuit 19 for a driving motor 15. The control circuit 17 and the memory 18 together form a computer unit 20 consisting of integrated circuits.

When a focusing completion button 30 disposed below a screen 8 shown in FIG. 4 is depressed, the control circuit 17 operates to cause the signal outputted from the measurement device 16 to store in the memory means 18. Thereafter the control circuit 17 compares the signal inputted from the device 16 with the signal stored in the memory and outputs a control signal to the drive circuit 19 for the drive motor 15 so as to move the lens 4 toward the in-focus position, in the case where the input signal disagrees with the stored signal as a result of causing difference in the distance between the lens 4 and the microfilm 3. By the operation of this drive motor 15, the focus gear 4a is turned, thereby making adjustment of the lens position. In this way, the specified distance between the lens 4 and the microfilm 3 is held in the in-focus condition by means of the fact the input signal from the measurement device 16 coincides with the stored signal in the memory. This automatic control state is set off by depressing a manual operation button 31 placed below the screen 8.

Figure 5:
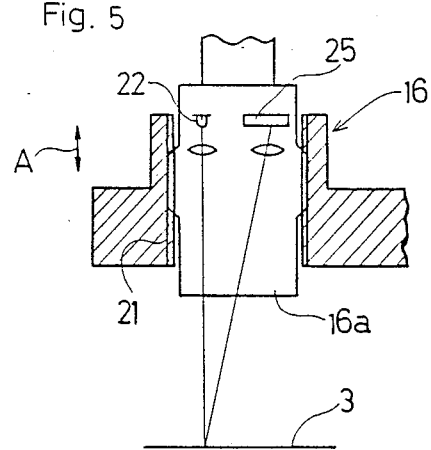
FIG. 5 is a schematic diagram of a measurement device employed in a first embodiment of the present invention.
Figure 6:
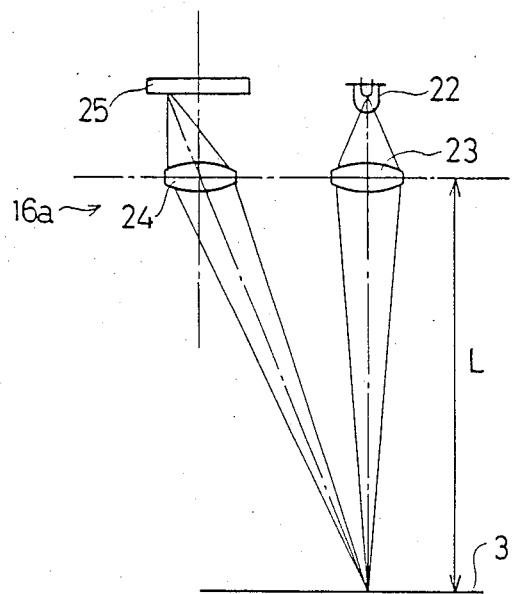
FIG. 6 is an explanatory diagram showing the measurement principle of the device shown in FIG. 5.
Figure 7:
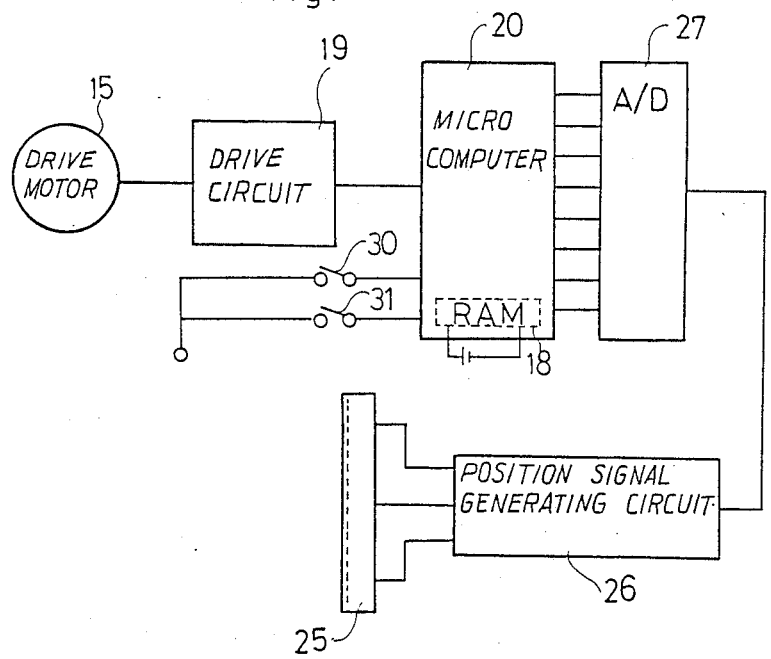
FIG. 7 is a block diagram of the control circuit of the device shown in FIG. 5.

The measurement device 16 is so constructed, as shown in FIGS. 4 and 5, that its measuring section 16a moves adjustable along the arrow A by a feed screw mechanism 21 related to the turning of the focus gear 4a, whereby the measuring section 16a moves substantially integrally with the projective lens 4 in the optical axis direction. The measuring section 16a is so constructed, as shown in FIG. 6, that light is emitted from a light source 22 such as LED, to a microfilm 3 through a lens 23, the light reflected from the microfilm entering into the position-detecting element 25 through a lens 24. And the position-detecting element 25 alters its output signal in correspondence with the portion of receiving the light. Accordingly, as the distance L between the lenses 23, 24 and the microfilm 3 is changed, the light receiving portion of the position-detecting element 25 is thereby altered and, as a result, the output signal from the position-detecting element 25 is varied in accordance with the position of the section 16a. This output signal, as shown in FIG. 7, is converted into a position signal proportional to the distance L at a position signal generating circuit 26, to be outputted to the microcomputer 20 through an A/D converter 27.

In the following, the operation of the present device is described. First, the automatic control state is set off by depressing the manual operation button 31, and the second, an image of the microfilm 3 is projected onto the screen 8 in the in-focus condition by manually turning the focus gear 4a. Then as the focusing completion button 30 is depressed, the output signal from the measurement device 16 corresponding to the distance between the measuring section 16a and the microfilm 3 in the in-focus condition is stored in an RAM 18 provided as a memory means. Thereafter, an output signal from the measurement device 16 is compared with the signal stored in the RAM 18 and if these two parties are not in agreement, a control signal will be outputted to the drive circuit 19 from the control device 17, then, the drive motor 15 operates to turn the focus gear 4a, thereby automatically maintaining the proper distance between the projective lens 4 and the microfilm 3 in the in-focus condition.

When the projective lens is interchanged to another lens of different magnification, the interchanged lens is manually moved to the in-focus position and automatically maintains the in-focus condition by depressing the focusing completion button 30.

Since the initial focusing is manually made in this embodiment, this method is particularly effective for obtaining and maintaining the in-focus condition in overhead projectors because the distance between an original and a screen in the overhead projectors is often altered.

Another embodiment of the present invention wherein the focusing is always automatically performed will be described with reference to FIGS. 8 through 12 in the following.

Figure 8:
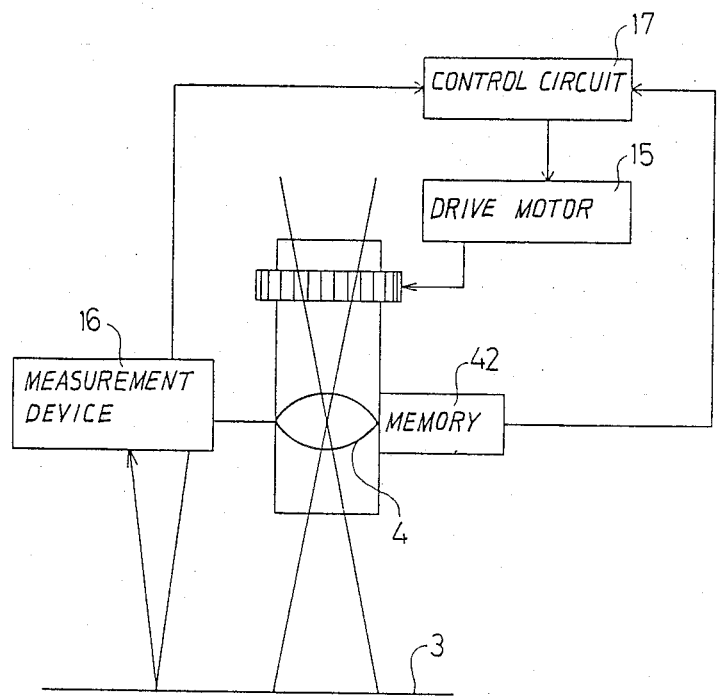
FIG. 8 is a schematic diagram of another focusing device according to the present invention, in which a memory for storing a distance data inherent to the projective lens provided on thereon.

Outline of the whole of the microfilm reader-printer is nearly same as that of the above described embodiment. What differentiates it from the former is a focusing device which works as follows: As shown in FIG. 8, a memory 42, in which the distance data between the projective lens 4 and the film 3 taken at the in-focus condition is stored, is provided on the projective lens 4. The distance signal between the projective lens 4 and the film 3 taken by use of a measurement device 16 and the distance data stored in the memory 42 are given to the control circuit 17. Then the control circuit 17 operates the drive motor 15 in response to these inputs, thereby to position the projective lens 4 to its in-focus position automatically. Accordingly, with this device, the focusing is made automatically after fitting a projective lens.

Figure 9:
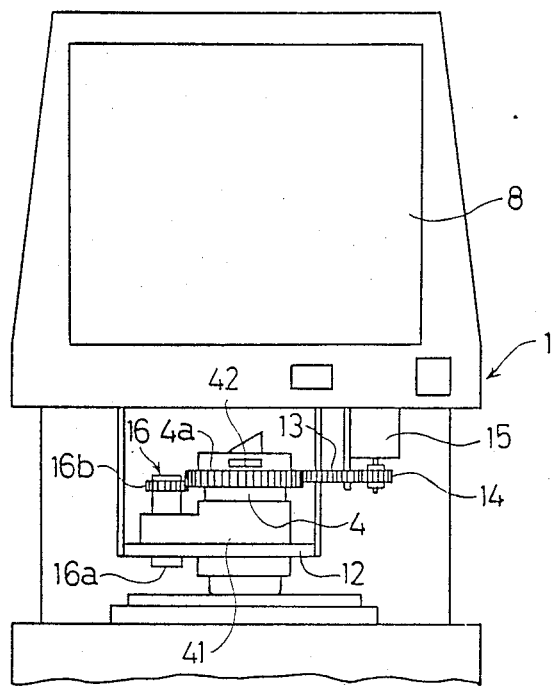
FIG. 9 is a schematic front view of a microfilm reader-printer provided with the device of FIG. 8, its bottom part being omitted.

An outline of the whole of a microfilm reader-printer provided with this focusing device is shown in FIG. 9.

Figure 10:
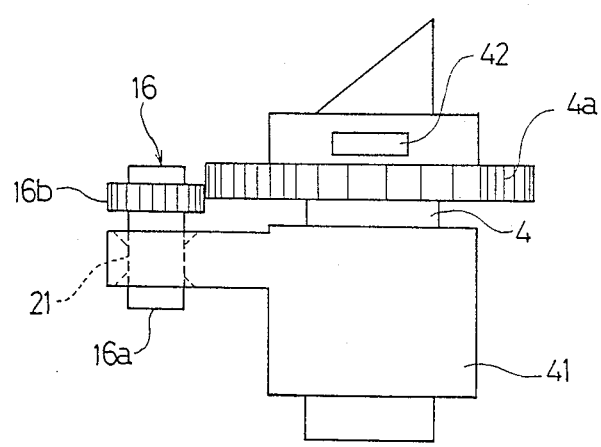
FIG. 10 is a side elevation of a projective lens provided with a memory thereon employed in the device shown in FIG. 8.

In this apparatus, the integral movement along to the optical axis of the measurement device 16 and the projective lens 4 is made possible, as shown in FIG. 10, by holding through a feed screw mechanism 21 the measurement device 16 on a lens holder 41 which movably holds the projective lens 4 for its focusing.

Figure 11:
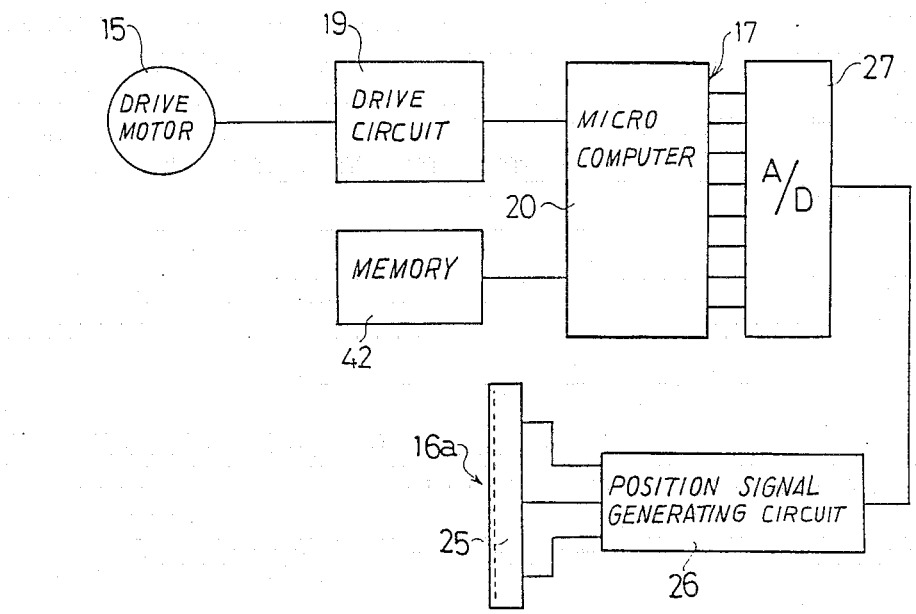
FIG. 11 is a block diagram of the control circuit of the device shown in FIG. 8.

The control circuit 17 includes, as shown in FIG. 11, a microcomputer 20 and a memory 42 joined therewith.

The microcomputer 20 not only reads the distance data stored in the memory 42, but makes judgment on whether the position signal from generating circuit 26 based on the measuring at the measurement section 16a is in agreement with the distance data detected and in response to this result, the drive circuit 19 for the drive motor 15 is controlled. Particularly, when the distance data and the position signal are in agreement, the projective lens 4 is in its in-focus position. Then the judgment of the focus being adjusted is made to keep the projective lens 4 at the in-focus position. And if the position signal is on the forward or backward side of the exact focal point, judgment of the focus being shifted forward or backward is made, to so control the drive circuit 19 as to move the projection lens 4 to its in-focus position, thereby making the motor 15 run normally or reversally.

Figure 12:
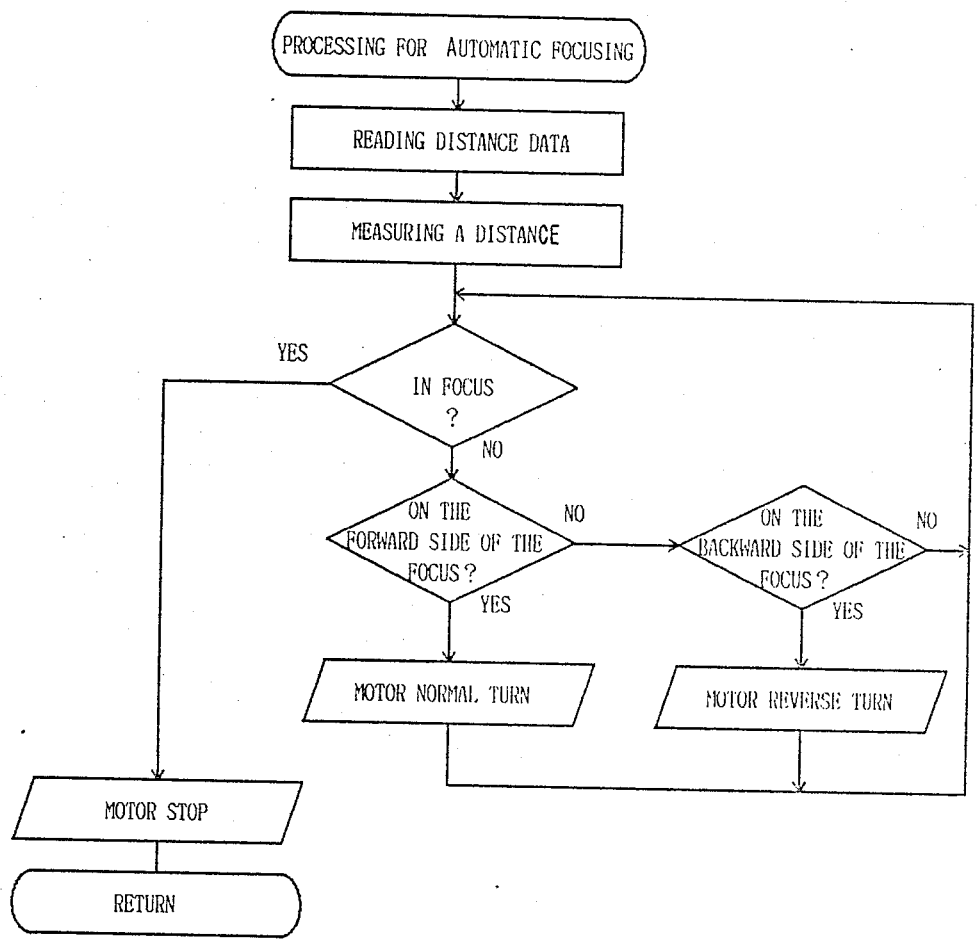
FIG. 12 is a flow chart showing the setup for automatic focusing process by use of a control circuit.

With the movement of the projective lens 4, the position signal undergoes change and as the projective lens 4 has reached its in-focus position, the position signal is in agreement with the distance data; the microcomputer 20 makes an in-focus judgment, causing the drive motor 15 to stop by making the drive circuit 19 off. A flow chart for this control is as shown in FIG. 12.

Such an automatic focusing operation may be performed not only in the case of setting another projective lens having its own memory, but at any appropriate time even continuously, while the micro reader-printer 1 is in operation.

In this way, it is possible always to have a projected image in focus or a copied image in focus.

For the memory 42 for each projective lens 4, use of an ROM or an unvolatile RAM is preferable. If an ROM is used, the distance data for the projective lens 4 on which it is mounted is stored therein, for it to be read out by the microcomputer 20. If the unvolatile RAM is used, users may write in new in-focus distance data by use of a write button, which is not shown in the drawings, whereby correction for any error as in the gear ratio affected by a focus gear 4a in each projective lens may be made, thereby attaining still more accurate automatic focusing. And adjustments may be conveniently made against aberration in the distance from an overhead projector to a screen.

Furthermore, if the amounts of adjustment depending on the type of film, etc., are constant, then, with various correction functions given to the microcomputer, the distance data may be automatically corrected by setting the projecting conditions such as the film used, when using the micro reader-printer 1. Still further, the distance data may be adjusted by setting the correction width that meets the operation conditions on the microcomputer 20 side.

For the distance data given to the projective lens 4, mechanical signal sources like projections, or other suitable signal sources, besides the above electrical one, may be employed; they may be used, after converting them into the necessary distance data on the micro reader-printer side.

What is claimed is:

1. A focusing device for use in an optical apparatus which projects an image of an original to a fixed projective surface with a projective lens, the device comprising:
   drive means for shifting the projective lens along the optical axis;
   measurement means, adapted to shift together with the projective lens, for measuring a distance between the original and the projective lens and for generating a distance signal representing the measured distance;
   memory means for storing distance data according to the distance signal generated from the measurement means when the projective lens is shifted to an in-focus position by a manual focusing operation; and
   control means for generating a drive signal to the drive means in order to shift the projective lens toward the in-focus position when a distance represented by the distance signal which is generated from the measurment means is different from a distance represented by the distance data which is stored in the memory means.

2. A focusing device as defined in claim 1, wherein the optical apparatus has a lens mounting device on which one of projective lenses of varied magnifications is fitted interchangeably.

3. A focusing device as defined in claim 1, further comprising:
   first input means for inputting an inhibit-instruction of inhibiting the shift of the projective lens by the drive means at the automatic focusing operation in order to manually move the projective lens for the manual focusing operation.

4. A focusing device as defined in claim 3, further comprising:
   second input means for inputting an in-focus instruction representing that the projective lens has been shifted in the in-focus position by the manual focusing operation;
   wherein the memory means stores the distance data according to the distance signal from the measurement means upon input of the in-focus instruction.

5. A focusing device as defined in claim 1, wherein the measurement means comprises:
   light emitting means for emitting light to the original; and
   light detecting means for receiving the light reflected by the original to generate the distance signal representing a distance between the original and the projective lens.

6. A focusing device for use in an optical apparatus which projects an image of an original to a fixed projective surface with a projective lens, the device comprising:
   drive means for shifting the projective lens along the optical axis;
   measurement means, adapted to shift together with the projective lens, for measuring a distance between the original and the projective lens and for generating a distance signal representing the measured distance;
   memory means being provided to the projective lens for storing a distance data representing a distance between the original and the projective lens in an in-focus position according to the charactereistic of the lens; and
   control means for controlling the drive means to shift the projective lens to the in-focus position in response to the distance data stored in the memory means and the distance signal generated from the measurement means.

7. A focusing device as defined in claim 6, wherein the optical apparatus has a lens mounting device on which one of projective lenses of varied magnifications is fitted interchangeably.

8. A focusing device as defined in claim 7, wherein each of the respective projective lenses has the memory means which stores the distance data according to the characteristics of each of the projective lenses.

9. A focusing device as defined in claim 6, wherein the measurement means comprises:
light emitting means for emitting light to the original; and
light detecting means for receiving the light reflected by the original to generate the distance signal representing a distance between the original and the projective lens.

10. A focusing device as defined in claim 6, wherein the control means generates a drive signal to the drive means in order to shift the projective lens toward the in-focus position when a distance represented by the distance signal which is generated from the measurement means is different from a distance represented by the distance data which is stored in the memory means.

11. A focusing device as defined in claim 6, wherein the control means controls the drive means in order to make a distance represented by the distance signal which is generated from said measurement means coincide with a distance represented by the distance data which is stored in the memory means.

12. A focusing device as defined in claim 9, wherein the optical apparatus has a lens mounting device on which one of projective lenses of varied magnification is fitted interchangeably, and each of the projective lenses is provided with a memory means respectively which stores the distance data according to the characteristics of each of the projective lenses.

13. A focusing device as defined in claim 12, wherein the projective lens and the measurement means are composed integrally and detached together from the optical apparatus.

14. A focusing device as defined in claim 8, wherein the measurement means comprises:
light emitting means for emitting light to the original; and
light detecting means for receiving the light reflected by the original to generate the distance signal representing a distance between the original and the projective lens.

15. A focusing device for use in an optical apparatus provided with a projective lens thereon comprising:
drive means for shifting the projective lens along the optical axis;
memory means for storing a distance data representing a distance between an original and the projective lens in an in-focus position;
measurement means, adapted to move relatively to the movement of the projective lens, for measuring a distance between the original and the projective lens and for generating a distance signal representing the measured distance; and
control means for controlling the drive mean in order to coincide a distance represented by the distance signal which is generated from said measurement means with a distance represented by the distance data which is stored in the memory means.

16. A focusing device as defined in claim 15, wherein the optical apparatus has a lens mounting device on which one of projective lenses of varied magnifications is fitted interchangeably.

17. A focusing device as defined in claim 15, further comprising:
first input means for inputting an inhibit-instruction of inhibiting the shift of the projective lens by the drive means at the automatic focusing operation in order to manually move the projective lens for a manual focusing operation.

18. A focusing device as defined in claim 17, further comprising:
second input means for inputting an in-focus instruction representing that the projective lens has been shifted in the in-focus position by the manual focusing operation; and
second control means for controlling the memory means in order to store a distance data according to a distance signal generated from the measurement means upon the second input means is operated.

19. A focusing device as defined in claim 16, wherein each of the projective lenses is provided with a memory means respectively which stores the distance data according to the characteristics of each of the projective lenses.

20. A focusing device as defined in claim 19, wherein the projective lens and the measurement means are composed integrally and detached together from the optical apparatus.

21. A focusing device as defined in claim 15, wherein the measurement means comprises:
light emitting means for emitting light to the original; and
light detecting means for receiving the light reflected by the original to generate the distance signal representing a distance between the original and the projective lens.

* * * * *